United States Patent
Inanc et al.

(10) Patent No.: US 12,332,401 B2
(45) Date of Patent: Jun. 17, 2025

(54) SYSTEM AND METHOD FOR DOWNHOLE GAMMA RAY INSPECTION BEHIND MULTISTRING COMPLETIONS

(71) Applicant: Baker Hughes Oilfield Operations LLC, Houston, TX (US)

(72) Inventors: Feyzi Inanc, Houston, TX (US); Joseph Olaiya, Houston, TX (US); Allan Jones, Houston, TX (US); Peng Yuan, Houston, TX (US); Toyli Anniyev, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 212 days.

(21) Appl. No.: 17/982,097

(22) Filed: Nov. 7, 2022

(65) Prior Publication Data
US 2023/0144478 A1    May 11, 2023

Related U.S. Application Data

(60) Provisional application No. 63/276,029, filed on Nov. 5, 2021.

(51) Int. Cl.
| | |
|---|---|
| *G01V 5/12* | (2006.01) |
| *E21B 47/00* | (2012.01) |
| *E21B 47/005* | (2012.01) |
| *E21B 47/10* | (2012.01) |

(52) U.S. Cl.
CPC .............. *G01V 5/12* (2013.01); *E21B 47/005* (2020.05); *E21B 47/10* (2013.01)

(58) Field of Classification Search
CPC .......... E21B 47/005; E21B 47/10; G01V 5/12
See application file for complete search history.

(56) References Cited

U.S. PATENT DOCUMENTS

| | | |
|---|---|---|
| 5,219,518 A | 6/1993 | McKeon et al. |
| 6,300,624 B1 | 10/2001 | Yoo |
| 7,202,456 B2 | 4/2007 | Mickael |
| 8,269,162 B2 | 9/2012 | Kirkwood |
| 8,455,812 B2 | 6/2013 | Nikitin |
| 8,975,574 B2 | 3/2015 | Huiszoon |
| 10,138,727 B2 | 11/2018 | Zeroug |
| 10,451,766 B2 | 10/2019 | Xu |

(Continued)

OTHER PUBLICATIONS

International Search Report and Written Opinion issued Mar. 29, 2023 in PCT Application No. PCT/US2022/049135.

*Primary Examiner* — Mark R Gaworecki
(74) *Attorney, Agent, or Firm* — Hogan Lovells US LLP

(57) ABSTRACT

A method for identifying a defect within a cement layer of a multi string wellbore includes deploying a gamma scanner into the multistring wellbore, the gamma scanner including at least one source and at least one detector, the at least one source emitting radiation into the multistring wellbore and the at least one detector receiving backscatter radiation. The method also includes obtaining, from the gamma scanner, a count rate associated with at least one region of interest of the multistring wellbore. The method further includes identifying, based at least in part on data acquired from the gamma scanner, a background profile for the multistring wellbore. The method includes removing the background profile from the count rate. The method further includes identifying, within the at least one region of interest, a defect within the cement layer.

20 Claims, 12 Drawing Sheets

(56) References Cited

U.S. PATENT DOCUMENTS

| | | |
|---|---|---|
| 10,920,568 B2 | 2/2021 | Hu |
| 10,955,582 B2 | 3/2021 | Jurczyk |
| 10,969,510 B2 | 4/2021 | Quintero |
| 11,066,926 B2 | 7/2021 | Ramirez et al. |
| 11,067,716 B2 | 7/2021 | Inanc et al. |
| 2014/0052376 A1 | 2/2014 | Guo et al. |
| 2020/0132880 A1 | 4/2020 | Inanc et al. |
| 2021/0247538 A1 | 8/2021 | Guedes et al. |

SYSTEM AND METHOD FOR DOWNHOLE GAMMA RAY INSPECTION BEHIND MULTISTRING COMPLETIONS

CROSS-REFERENCE TO RELATED APPLICATIONS

This application claims priority to and the benefit of U.S. Provisional Patent Application No. 63/276,029, filed Nov. 5, 2021, titled "SYSTEM AND METHOD FOR DOWNHOLE GAMMA RAY INSPECTION BEHIND MULTISTRING COMPLETIONS," the full disclosure of which is hereby incorporated by reference herein in its entirety for all purposes.

BACKGROUND OF THE DISCLOSURE

1. Field of the Disclosure

Embodiments are directed toward downhole inspection, and more particularly to systems and methods for performing downhole inspection in multistring completions with a gamma source.

2. Brief Description of Related Art

Downhole logging and inspection tools are used to collect various data about a wellbore or well system. For example, gamma ray logging tools may be used to detect wellbore properties, such as formation density, among others, while downhole inspection tools may be used to detect errors or flaws in associated downhole components. Some gamma ray instruments send gamma rays into a formation and detect those that are scattered back. Energy levels of the backscattered radiation may be utilized to determine one or more properties. Typically, a source is collimated so that the gamma rays are sent in a certain direction. Often, the detector is collimated as well. As a result, azimuthal information is missing from traditional instruments without rotating the source and/or tool, which is time consuming and challenging.

SUMMARY OF THE DISCLOSURE

Applicants recognized the problems noted above herein and conceived and developed embodiments of systems and methods, according to the present disclosure, for utilizing downhole gamma ray instruments.

In an embodiment, a method for identifying a defect within a cement layer of a multistring wellbore includes deploying a gamma scanner into the multistring wellbore, the gamma scanner including at least one source and at least one detector, the at least one source emitting radiation into the multistring wellbore and the at least one detector receiving backscatter radiation, wherein the emitted radiation is directable about a wellbore axis to obtain an azimuthal scan of the multistring wellbore. The method also includes obtaining, from the gamma scanner, a count rate associated with at least one region of interest of the multistring wellbore. The method further includes identifying, based at least in part on data acquired from the gamma scanner, a background profile for the multistring wellbore. The method includes removing the background profile from the count rate. The method further includes identifying, within the at least one region of interest, a defect within the cement layer.

In an embodiment, a method for identifying a defect within a multistring wellbore includes aligning a scanning tool with a first region of interest of the multistring wellbore. The method also includes obtaining first data corresponding to a first count rate at the first region of interest. The method further includes aligning the scanning tool with a second region of interest of the multistring wellbore. The method also includes obtaining second data corresponding to a second count rate for the second region of interest. The method includes identifying based at least in part on the first count rate and the second count rate, a defect within at least one of the first region of interest or the second region of interest, the defect being associated with a cement layer of the multistring wellbore that is behind at least one other intermediate layer positioned between the scanning tool and the cement layer.

In an embodiment, a downhole logging system includes a gamma ray source positioned within a logging tool, the gamma ray source to emit radiation into an area surrounding the logging tool. The system also includes a collimator associated with the gamma ray source, the collimator to adjust an opening to direct a flow of radiation into the formation to permit gamma ray scanning of the formation. The system further includes a radiation detector operable to detect backscatter radiation from the area. The detector shield has an aperture to let the gamma rays from a certain azimuth. The source collimator and the detector aperture are aligned and their rotations are synchronized. The system is capable of acquiring azimuthal information due to rotation of the source collimator and the detector aperture. The area includes a multistring completion having at least one casing and at least one cement layer, the logging tool being positioned within a tubular extending into an annulus of the casing.

In an embodiment, a downhole logging system includes a gamma ray source positioned within a logging tool, the gamma ray source to emit radiation into an area surrounding the logging tool. The system also includes a collimator associated with the gamma ray source, the collimator to adjust an opening to direct a flow of radiation into the formation to permit gamma ray scanning of the formation. The system further includes a radiation detector operable to detect backscatter radiation from the area, the radiation detector associated with an aperture movable to be aligned with the collimator associated with the source. The system includes a motor to rotate the collimator and the aperture in either a continuous or stepping fashion for scanning a borehole. The system further includes that the area includes a multistring completion having at least one casing and at least one cement layer, the logging tool being positioned within a tubular extending into an annulus of the casing.

BRIEF DESCRIPTION OF THE DRAWINGS

The present technology will be better understood on reading the following detailed description of non-limiting embodiments thereof, and on examining the accompanying drawings, in which.

DETAILED DESCRIPTION

Figure 1:
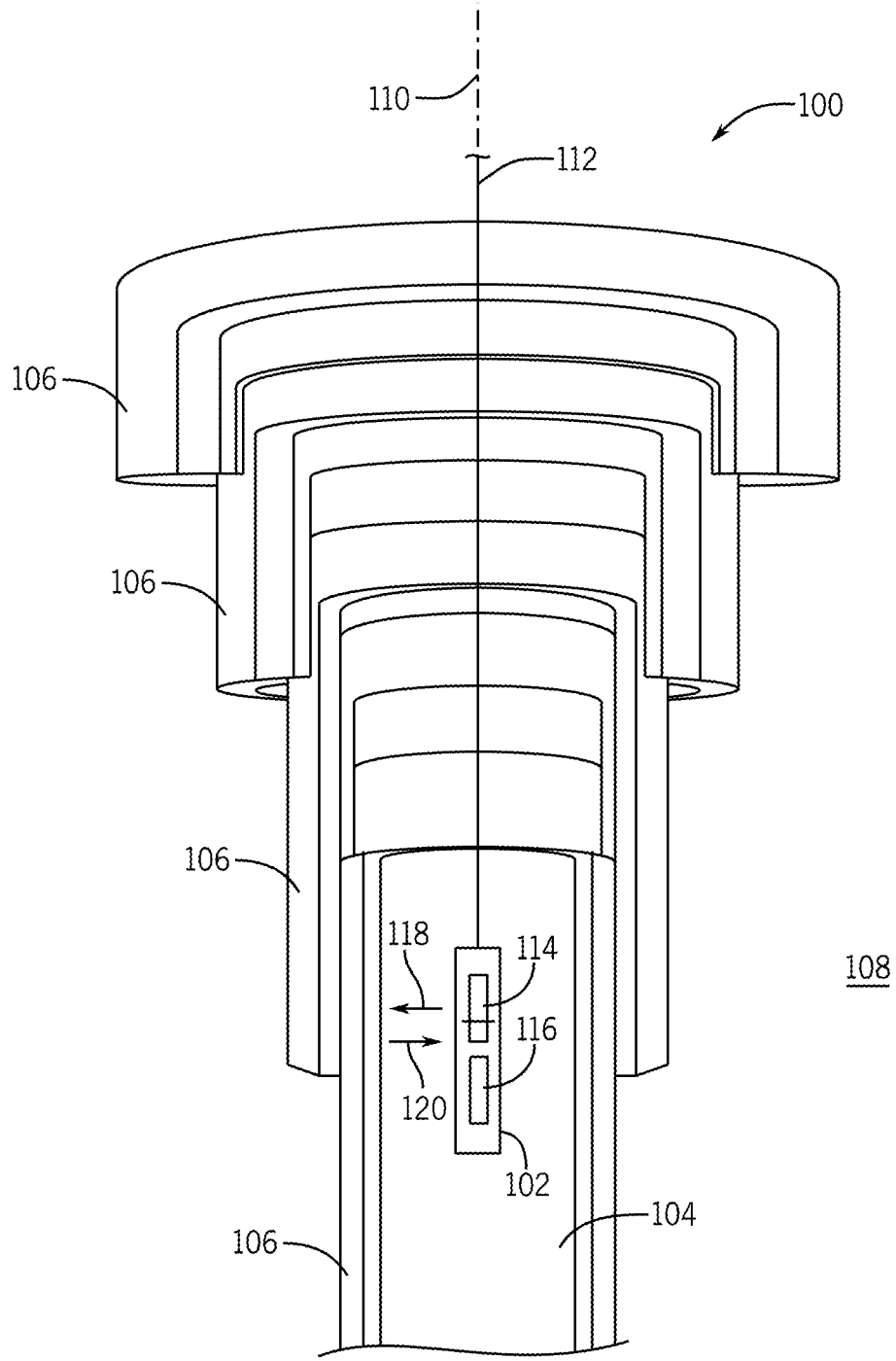
FIG. 1 is a schematic cross-sectional view of an embodiment of a downhole logging tool positioned in a wellbore, in accordance with various embodiments.

The foregoing aspects, features and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. The present technology, however, is not intended to be limited to the specific terms used, and it is to be understood that each specific term includes equivalents that operate in a similar manner to accomplish a similar purpose.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments," or "other embodiments" of the present disclosure are not intended to be interpreted as excluding the existence of additional embodiments that also incorporate the recited features. Furthermore, reference to terms such as "above," "below," "upper", "lower", "side", "front," "back," or other terms regarding orientation are made with reference to the illustrated embodiments and are not intended to be limiting or exclude other orientations. Furthermore, like reference numbers may be used between figures to illustrate like components, but it should be appreciated that embodiments are not limited to utilizing like components.

Embodiments of the present disclosure are directed toward downhole inspection systems and methods, such as those that may be utilized for cement channeling detection. In at least one embodiment, embodiments are utilized in a multistring completion where one or more defects or flaws are detected through one or more different attenuating layers, such as a tubing string, annulus, casing, cement, or the like. Furthermore, systems and methods may utilize gamma scanner concepts to obtain azimuthal information from the wellbore and different wellbore components.

Systems and methods are directed toward improvements in downhole inspection and logging, where cement inspection, such as cement behind a casing, may be challenging to perform in a multistring completion, particularly with a gamma source, and moreover with appropriate azimuthal sensitivity. Various embodiments provide for one or more tools where inspection is performed through both a casing layer and a tubing layer. That is, a scanner or downhole scanning instrument may be utilized to log through tubing. Furthermore, azimuthal measurement capabilities may be provided with the scanner so that images can be formed based, at least in part, on the logs.

Various embodiments of the present disclosure may be utilized to conduct one or more gamma scanner operations in a multistring competition for plug and abandon implementations. In at least one embodiment, systems and methods are used to detect cement channels in a multistring environment. Various embodiments may also be directed toward detecting tubing eccentricity in a multistring completion. Furthermore, systems and methods may be directed toward detecting a start or top of cement in a multistring environment. Additionally, embodiments are directed toward detecting casing and flaws in a multistring environment. It should be appreciated that various embodiments are further directed toward mitigating count rate sinusoidal variations (e.g., variations in count rates vs tool rotation angle) by using fluid displacers around the tool, based, at least in part, on a determination that there is enough space around the tool. For example, the background sinusoidal variations may be caused by the tool rotation, i.e., when tool is decentered, during the rotation, and the amount of fluid in front of source and detector will change and cause the counts change. Systems may also utilize background subtraction and/or flattening using logging data and/or modeled data and image processing techniques to remove sinusoidal background trends that degrade detectability.

FIG. 1 is a partial cross-sectional view of a well system 100 in which a downhole logging tool 102 is positioned to measure one or more characteristics of the well system 100 and/or associated components, in accordance with one or more embodiments. The illustrated well system 100 includes a multi-barrier well 104 with a plurality of barriers 106, such as tubing, cement layers, casing, and the like. The well 104 may be any type of well, including but not limited to conventional and unconventional hydrocarbon producing wells. Moreover, the well 104 may include deviated or angled sections. The logging tool 102 may be deployed downhole into the well 104 to perform various logging functions, such as detection of various anomalies, such as well defects, eccentricity, flaw structure, topology, integrity, and other information. Additionally, in various embodiments, the logging tool 102 may be deployed to obtain information indicative of wellbore and/or formation characteristics, such as formation density. In various embodiments, the logging tool 102 may include an imaging device such as a nuclear imaging device, or various other types of logging devices such as acoustic devices, electromagnetic devices, magnetic resonance devices, other forms of radiation-based devices, among others. It should be appreciated that the logging tool 102 may be deployed through one or more tubulars arranged within an annulus of the wellbore.

In the illustrated embodiment, the well system 100 includes a series of tubular barriers 106, which may include metallic casings or tubings and cement walls between the casings. Specifically, in various embodiments, the wellbore may be cased by the tubular casings and held into place against the formation 108 and/or other casing sections via cement forming the cement walls. It may be desirable to inspect various characteristics of the casing and/or the cement walls, for example for potential abnormalities or defects such as fluid channel defects, bonding defects, air voids, defects in the casing, annulus defects, cement bonding defects, and eccentricity of the well, among others. Moreover, certain logging methods may be difficult to perform through the barriers 106. Abnormalities or defects may be referred to as wellbore characteristics and may further include additional information such as formation properties and the like.

Moreover, as noted above, logging tools may be useful in determining one or more characteristics of the formation. However, in multi-barrier wells, logging tools may need sufficient strength and/or intensity in order to penetrate into the formation 108 through the barriers 106. Furthermore, obtaining information from the barriers 106 may also utilize similar strength tools. One such tool composition is a nuclear logging tool, such as a gamma ray instrument. The gamma ray instrument includes at least one source and at least one detector. The source emits gamma rays into the formation and the detector receives backscattered radiation. The gamma ray instrument enables a variety of different measurements, such as formation density. Furthermore, it should be appreciated that various other nuclear logging tools may be utilized that include different sources, such as neutrons.

In the illustrated embodiment, the logging tool 102 traverses into the well 104 along a well axis 110 and is supported by a wireline 112, which may be a cable reinforced for wellbore operations and further including conductive materials to transfer energy and data signals. It should be appreciated that while a wireline system is illustrated in FIG. 1, embodiments of the present disclosure may be disposed on rigid tubing, coiled tubing, and with various other wellbore tubing structures. Furthermore, as noted above, the wireline 112 may be tripped down through a tubing arranged within an annulus.

It should be appreciated that various embodiments discussed herein describe logging tool 102 as a gamma radiation imaging tool, which may include a radiation generation unit 114 and a radiation detection unit 116. The radiation generation unit 114 may emit radiation 118 toward the formation 112 and possibly through one or more barriers, which may interact with one or more targets or regions of interest and produce a backscatter stream 120 of radiation toward the radiation detection unit 116. In various embodiments, the radiation generation unit 114 is a gamma ray emitter (e.g., Cesium-137). The radiation generation unit 114 may include a source that emits gamma rays isotropically and then is collimated to direct those gamma rays in a particular direction. Due to the stochastic nature of radiation emission, the source used for the radiation generation unit 114 may continuously emit gamma rays, which may be shielded or blocked until it is desired to emit the gamma rays into the formation. It should be appreciated that other sources may also be used, such as cyclic particle accelerators, inverse geometry x-ray machines (such as the configuration shown in U.S. patent application Ser. No. 16/517,089, now U.S. Pat. No. 11,073,627, which is hereby incorporated by reference).

In previous gamma ray instruments, the source of the radiation generation unit 114 and the radiation detection unit 116 may be collimated. As a result, emission of the gamma rays is known in a particular direction, and subsequent detection comes from a particular direction. This configuration leads to a lack of azimuthal resolution, which may be undesirable. For example, the tool may be reset and multiple logging runs may be processed in order to try to evaluate different areas of the formation, increasing costs for conducting the logging operation.

Embodiments of the present disclosure may utilize a collimated gamma ray source using spatial encoding functions that are mechanically introduced, such that the collimation either happens randomly with respect to the azimuthal direction or follows some pre-defined patterns. By doing so, azimuthal information about surrounding areas can be obtained and compressive sensing (CS) techniques can be used to further reduce required acquisition time, in-turn accelerating the logging procedure. In at least one embodiment, a "gamma scanner" may be utilized for multi-string evaluation. Gamma scanners may refer to one or more tools, which may include a detector and/or a source, that include shields or collimators that are aligned and synchronically rotated. By way of example, a collimator may surround the source and be moved to different azimuthal positions. In one or more embodiments, a collimator may surround the detector and be moved to different azimuthal positions to adjust a position of an aperture. In one or more embodiments, both the detector and source are collimated. During operation, rotation of both a source collimator and/or a detector aperture may be utilized to acquire azimuthal information. By way of example only, tools such as those described in U.S. patent application Ser. No. 16/727,109 (now U.S. Pat. No. 11,067,716) and U.S. patent application Ser. No. 16/590,796 (now U.S. Pat. No. 11,066,926), the disclosures of which are hereby incorporated by reference, may be utilized as gamma scanners.

Embodiments of the present disclosure are directed toward determining of one or more defects, such as cement channeling, based, at least in part, on information obtained from gamma ray measurements through a multistring completion. In various embodiments, both tubing eccentricity and/or defects may be determined in a multistring environment. By way of example, and as will be described below, a comparison of different count rates may be utilized, at least in part, to detect one or more of eccentricity and/or defects.

Various embodiments of the present disclosure may incorporate a gamma scanner in order to obtain azimuthal information from a multistring completion. As noted above, the gamma scanner may include one or more sources and one or more detectors that include one or more collimators for the one or more sources and/or the one or more detectors. The one or more collimators may be coupled to one or more motors, which drive rotation about an axis of the tool, in order to adjust a position of an opening and/or aperture. By way of example, a collimator may be associated with the source that includes one or more openings. In operation, radiation from the source may stream out of the one or more openings and into a surrounding area, such as an annulus, tubular, casing, cement, formation, or a combination thereof. As the motor drives rotation of the collimator, the one or more openings may change in position, thereby changing which areas of the annulus, tubular, casing, cement, formation, or combination thereof are interrogated. Matching counts with the position of the one or more openings may provide azimuthal information with respect to the surrounding area. It should be appreciated that one or more embodiments may further include collimator(s) associated with one or more detectors that include one or more apertures to receive radiation from the surrounding area. These collimator(s) associated with the one or more detector(s) may be coupled to a second motor or to the same motor as the collimator associated with the source. As noted above, rotation may change a position of the one or more apertures, that when associated with a time or count rate for different positions, provides azimuthal information with respect to the surrounding area. In at least one embodiment, the source collimator and one or more apertures are synchronously rotated.

Various embodiments of the present disclosure may be used to overcome problems with existing techniques associated with inspections in multistring scenarios, such as completions where multiple layers of tubing, cement, casing, and the like may be positioned between a tool and a formation. Prior approaches have used different interrogation techniques, such as neutron interrogation, due to the level of attenuation found in multistring scenarios. That is, previous approaches have not been able to use gamma ray sources, or other sources such as x-ray sources, in a manner that provides sufficient count rates in order to obtain actionable information with respect to cement (or other layers) within a multistring completion. Other than the large attenuation, which may make it difficult to obtain meaningful count rates, other problems with prior approaches include sinusoidal variations with count rates. For example, depending on a location of the source and/or detector with respect to fluid surrounding an opening in the collimator, a short space and a long space may receive different numbers of counts. Embodiments may incorporate various signal processing techniques to address these concerns, among others, to overcome the problems present in previous techniques.

Figure 2:
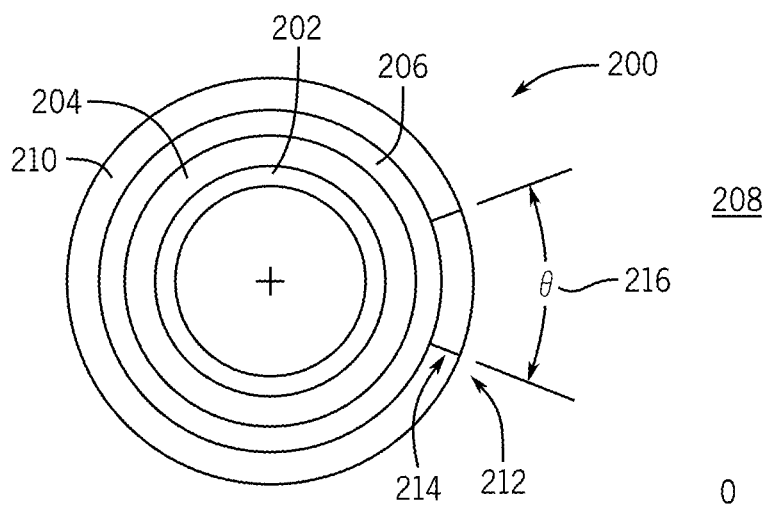
FIG. 2 is a schematic view of an embodiment of a wellbore environment, in accordance with various embodiments.

FIG. 2 is a top view of an embodiment of a wellbore environment 200, which may be used to practice one or more implementations of the present disclosure. In this example, tubing 202 is arranged within an annulus 204 formed within a casing 206. The casing 206 is secured to a formation 208 via a cement layer 210. It should be appreciated that there may be more layers of casing 206 and/or cement 210, such as in the embodiment shown in FIG. 1. Furthermore, while not illustrated in FIG. 2, one or more inspection tools may be arranged within the tubing 202.

In this example, a defect 212 is shown within the cement layer 210, which may also be referred to as channeling or a channel defect, among other options. The defect 212 has a size 214, which corresponds to a circumferential extent, as represented by the angle 216. It should be appreciated that the defect 212 may also have a longitudinal extent (not shown in this view) corresponding to an axial length the defect extends along a length of the casing 206 that may align with an axis of the wellbore. In at least one embodiment, the illustrated example may be referred to as a multi-string arrangement because an inspection tool will be positioned within the tubing 202, and therefore, emitted radiation will travel through at least three layers: 1) the tubing 202, 2) fluid within the annulus 204, and 3) the casing 206, in order to reach the cement 210. However, in various other embodiments, the tubing 202 may not be considered as part of the layers, and therefore, multiple casing layers may be necessary in order to describe a multistring arrangement that would include at least layers corresponding to: 1) an annulus, 2) a first casing layer, 3) a first cement layer, 4) a second casing layer, and 5) a second cement layer. As will be described below, various embodiments may be directed toward one or more inspection tools to detect the defect 212, among other characteristics.

Figure 3A:
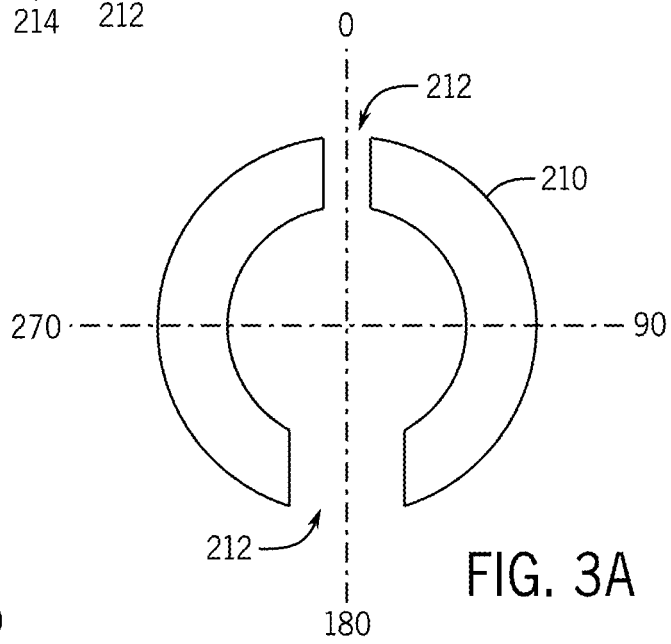
FIG. 3A is a schematic top view of an embodiment of a cement layer, in accordance with various embodiments.
Figure 3B:
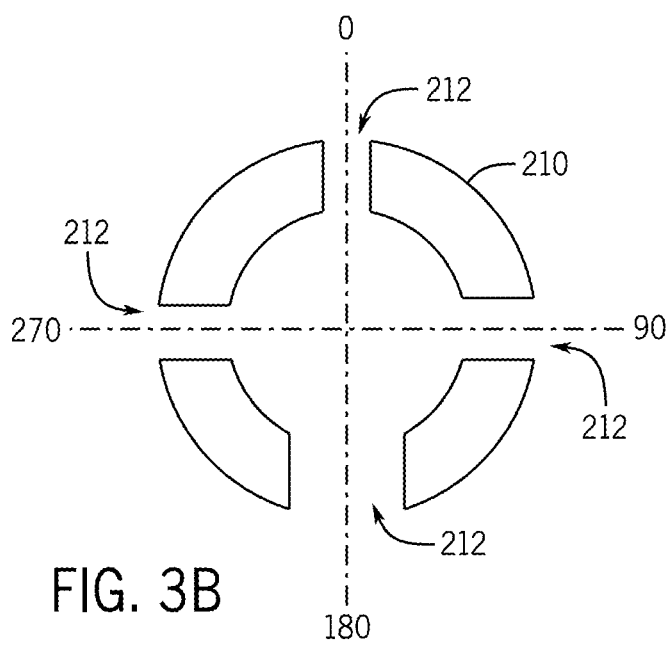
FIG. 3B is a schematic bottom view of an embodiment of a cement layer, in accordance with various embodiments.

FIGS. 3A-3G are views illustrating a defect in a cement layer of an associated wellbore. FIG. 3A is a top view of a cement section 210. In at least one embodiment, the cement section is a first cement layer. However, in other embodiments, the cement section is a second cement layer, a third cement layer, and so forth. In this example, two defects 212 are illustrated, one at 0 degrees and one at 180 degrees. FIG. 3B is a bottom view of cement section 210. In this example, four defects 212 are illustrated, with individual defects 212 shown at 0 degrees, 90 degrees, 180 degrees, and 270 degrees. As will be appreciated, more defects 212 are shown in FIG. 3B than in FIG. 3A due to an axial location of the defects 212, as will be described below.

Figure 3G:
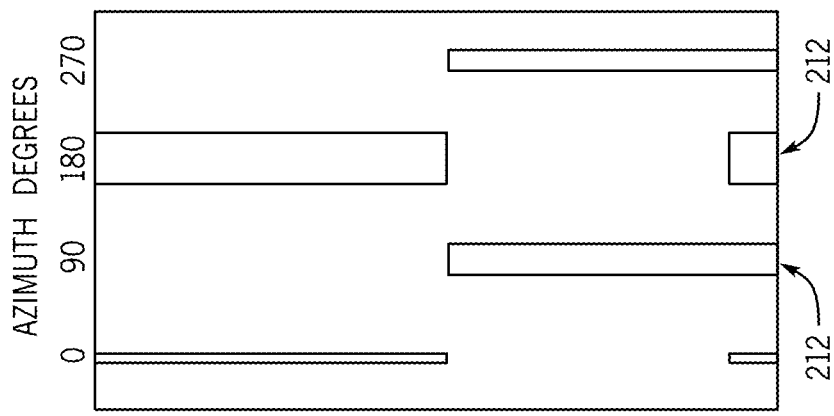
FIG. 3G is an image representation of a cement layer, in accordance with various embodiments.
Figure 3F:
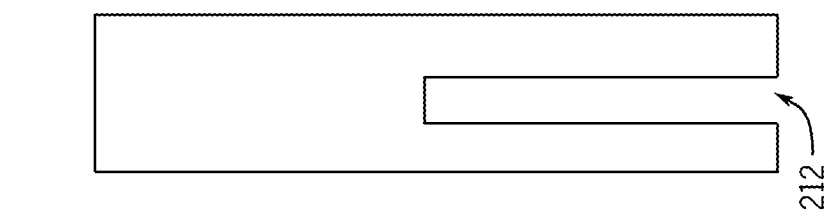
FIGS. 3C-3F are schematic side views of an embodiment of a cement layer, in accordance with various embodiments.
Figure 3E:
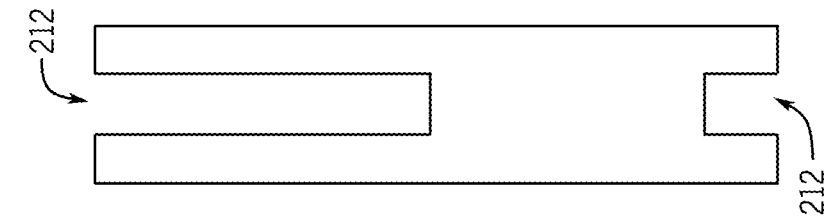
Figure 3D:
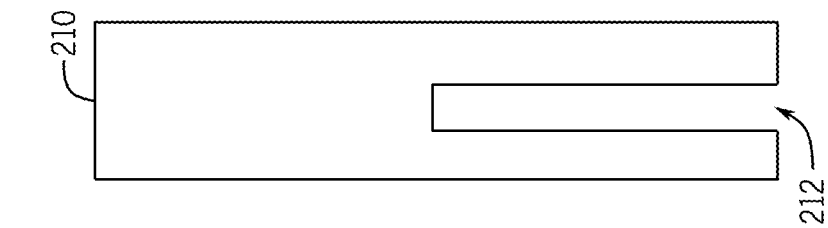
Figure 3C:
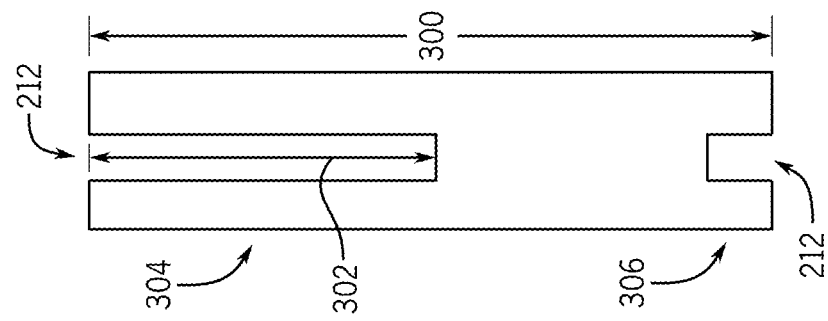

FIGS. 3C-3F illustrate side views of the cement layer 210, with FIG. 3C corresponding to 0 degrees, FIG. 3D corresponding to 90 degrees, FIG. 3E corresponding to 180 degrees, and FIG. 3F corresponding to 270 degrees. Each cement layer 210 corresponds to a particular axial length 300 within the wellbore. In these examples, defects 212 are shown as extending for different defect lengths 302. By way of example, FIG. 3C illustrates the defect 212 in two different axial positions, a first position 304 and a second position 306, which each defect 212 has a different defect length 302. As shown by way of example only, the defect 212 in the first position 304 has an axially longer defect length 302 than the defect 212 in the second position 306. A similar arrangement is also shown in FIG. 3E. However, as shown in FIGS. 3D and 3F, there may not be a defect in the first position 304. Furthermore, it should be appreciated that location defects are provided way of non-limiting example only and that there may be more or fewer defects, as well as defects at different circumferential positions, in various embodiments. FIG. 3G illustrates a composite of each defect 312 within a common image, where the image may be interpreted as being a "laid open" or "unrolled" tubular illustrating different defects 212 are different axial positions.

Figure 4A:
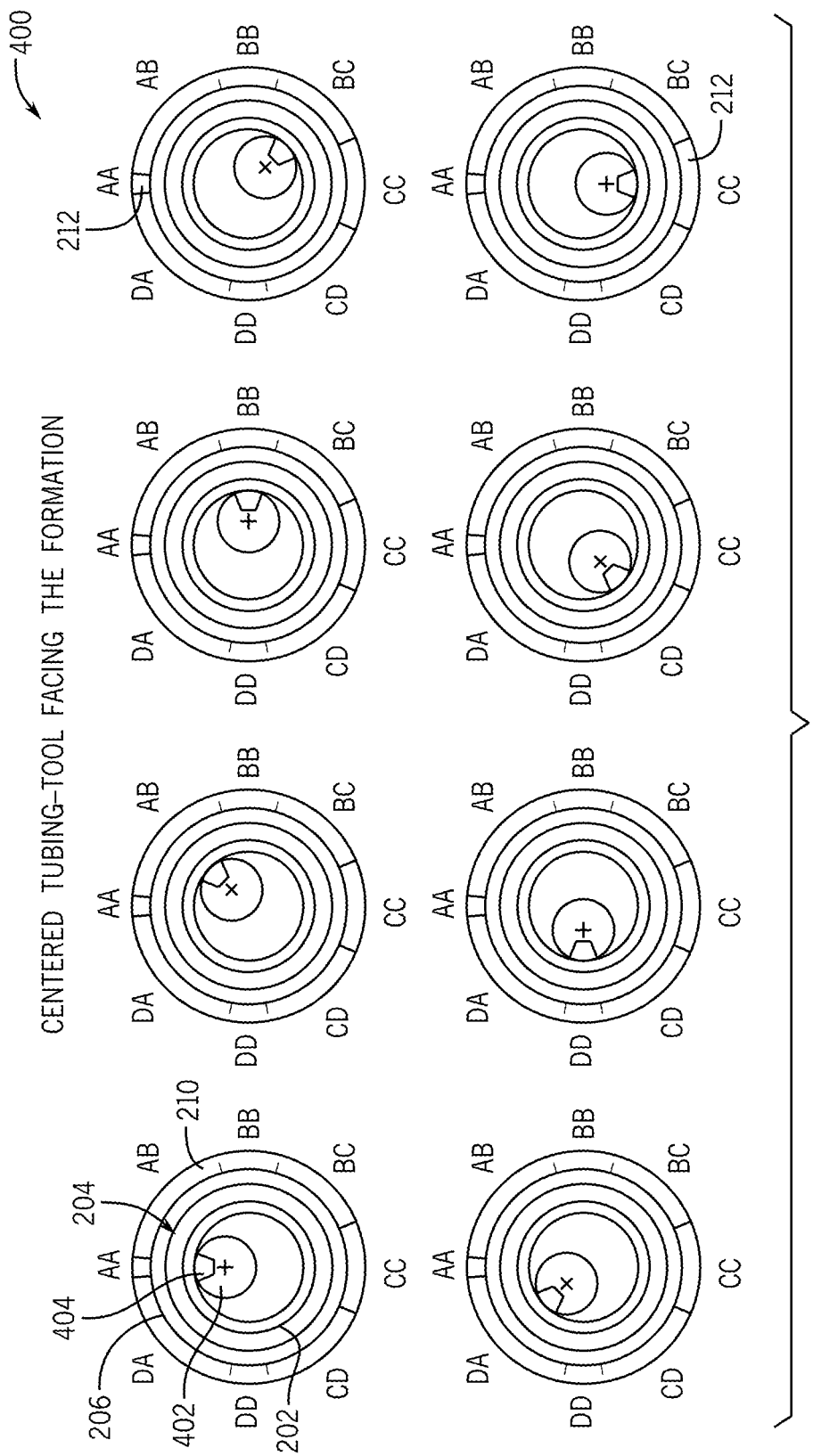
FIG. 4A is a schematic top view of an embodiment of a logging sequence, in accordance with various embodiments.

FIG. 4A illustrates an inspection environment 400 in which an inspection tool 402 is arranged within the tubing 202 within the casing 206. In this example, the tubing 202 is within the annulus 204, with the inspection tool 402 being positioned within the tubing 202, thereby creating multiple different layers (e.g., radial layers) prior to engaging with cement 210. That is, energy emitted from the tool 402 (e.g., gamma rays) travels through at least the tubing 202, the annulus 204, and the casing 206 prior to interacting with the cement 210. As noted herein, such as arrangement may be referred to as a multistring arrangement, but in other embodiments, multiple casing layers may be present in multistring arrangement layers.

Various embodiments may include one or more inspection tools 402 that provide azimuthal sensitivity, such as by rotating the tool 402 and/or rotating one or more components associated with the tool 402. For example, the tool 402 may include one or more rotatable shields, such as the tool described in U.S. patent application Ser. No. 16/727,109 (now U.S. Pat. No. 11,067,716), which is hereby incorporated by reference in its entirety. In this example, the environment 400 illustrates a sequence of inspection positions where an opening 404 rotates between different positions AA-DA. Moreover, in this example, the tool 402 is pushed up against the tubing 202 (e.g., the opening 404 is closely arranged to the tubing 202), but it should be appreciated that various embodiments may not include the tool 402 pushed up against the tubing 202. Furthermore, embodiments may not include the tubing 202 and only fluid within the annulus 204 may separate the tool 402 from the casing 206. Additionally, while the tubing 202 is shown as being centered, it should be appreciated that other embodiments may include tubing 202 in an eccentric position. That is, portions of the tubing 202 may be closer to different parts of the casing 206.

In this example, defects 212 are shown at positions AA and CC with respect to a top view. These defects 212 have different circumferential lengths, in that the defect 212 at position AA has a shorter circumferential length than the defect 212 at position CC. The inspection process shown in FIG. 4A may include rotating one or more of the tubing 202 and/or the tool 402 to change an orientation of the opening 404 to obtain azimuthal resolution of the wellbore. In this example, the tool 402 is moved to different positions along an inspection sequence. For example, the opening 404 is shown as being aligned with AA, AB, BB, BC, CC, CD, DD, and DA. In each sequence, the opening 404 is shown pushed up against the tubing 202 at the corresponding location. Such an arrangement is provided by way of example, as noted herein, and in various other embodiments the tool 402 may be stationary and a collimator may be rotated in order to change an orientation of the opening 404. Furthermore, in various embodiments, the tool 402 may be centered and not pushed up against the tubing 202.

Figure 4B:
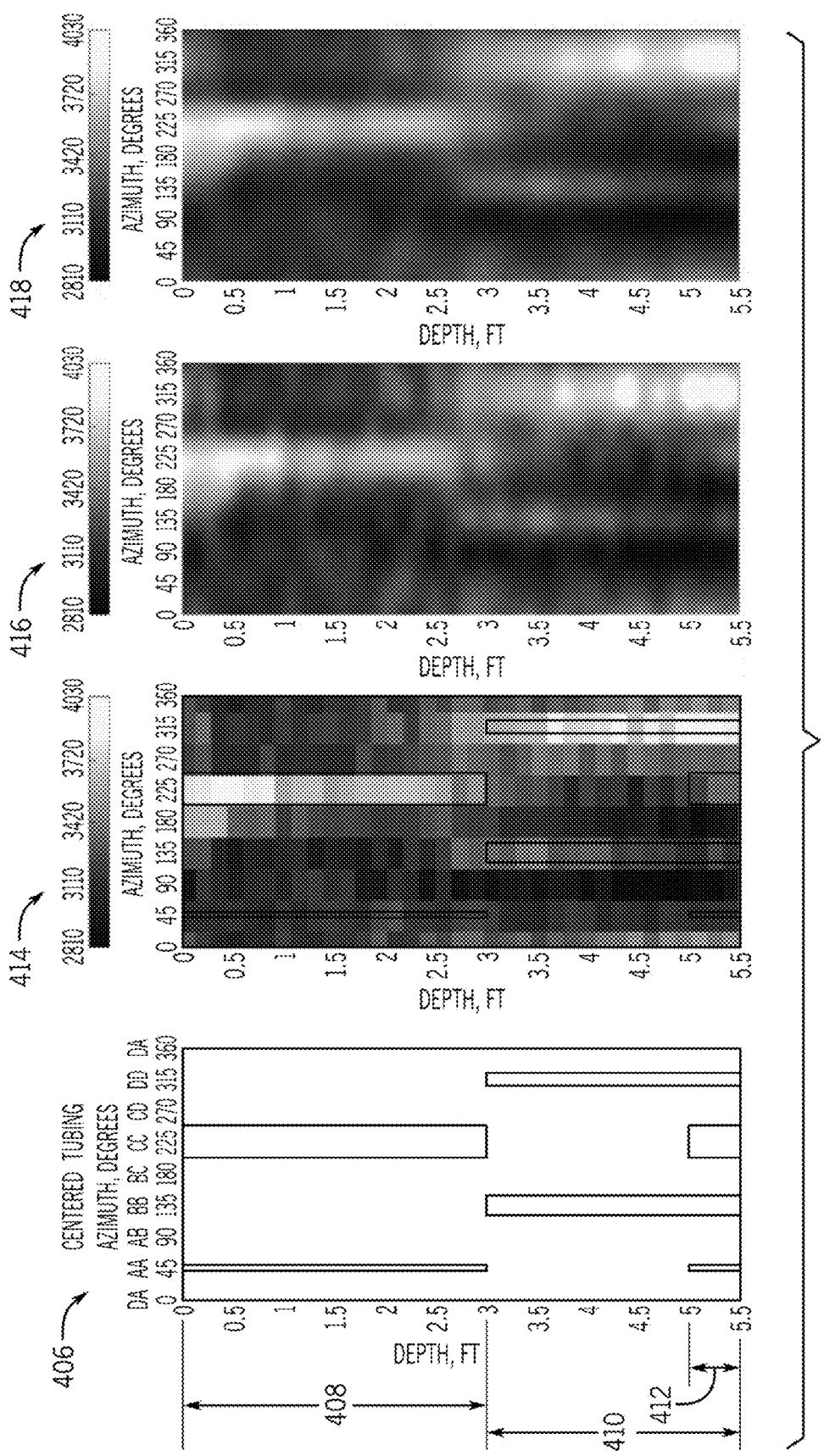
FIG. 4B is an image representation of a logging sequence, in accordance with various embodiments.

As shown in FIG. 4B, a representation 406 illustrates defects at AA and CC along a first length 408, defects at BB and DD for a second length 410, and defects at AA and CC at a different third length 412. Accordingly, the inspection sequence shown in FIG. 4A provides an azimuthal representation corresponding to a "laid out" or "unrolled" view of the cement 210. In this example, the representation 406 may be generated to quickly enable identification of regions with defects based, at least in part, on the image representations 414-418 that further illustrate these defects. For example, the lighter color is representative of the defects, allowing a rapid visual inspection to determine the defects. In at least one embodiment, such images may be provided to one or more software systems for analysis and categorization of defects based, at least in part, on the representations. For example, the data acquired may be aggregated to generate the representation 406.

In at least one embodiment, various processing techniques are deployed prior to generation of at least one of the representations 406, 414-418. By way of example, different signal processing techniques may be used to strip background counts or otherwise bin or prioritize different received measurements, such as counts. For example, sinusoidal background effects may artificially inflate count rates at different locations based, at least in part, on a position of the tool 402. Some of these effects may be mitigated using the techniques in FIG. 4A by driving a common location of the tool 402 (e.g., pushed up against the tubing 202). However, with eccentric tubing 202, or in embodiments where the tool 402 is not pushed up against the tubing 202, as well as embodiments where there is no tubing 202, these techniques may be less effective, and as a result, identification and removal of background counts may provide improvement measurements, as discussed herein.

Figure 5A:
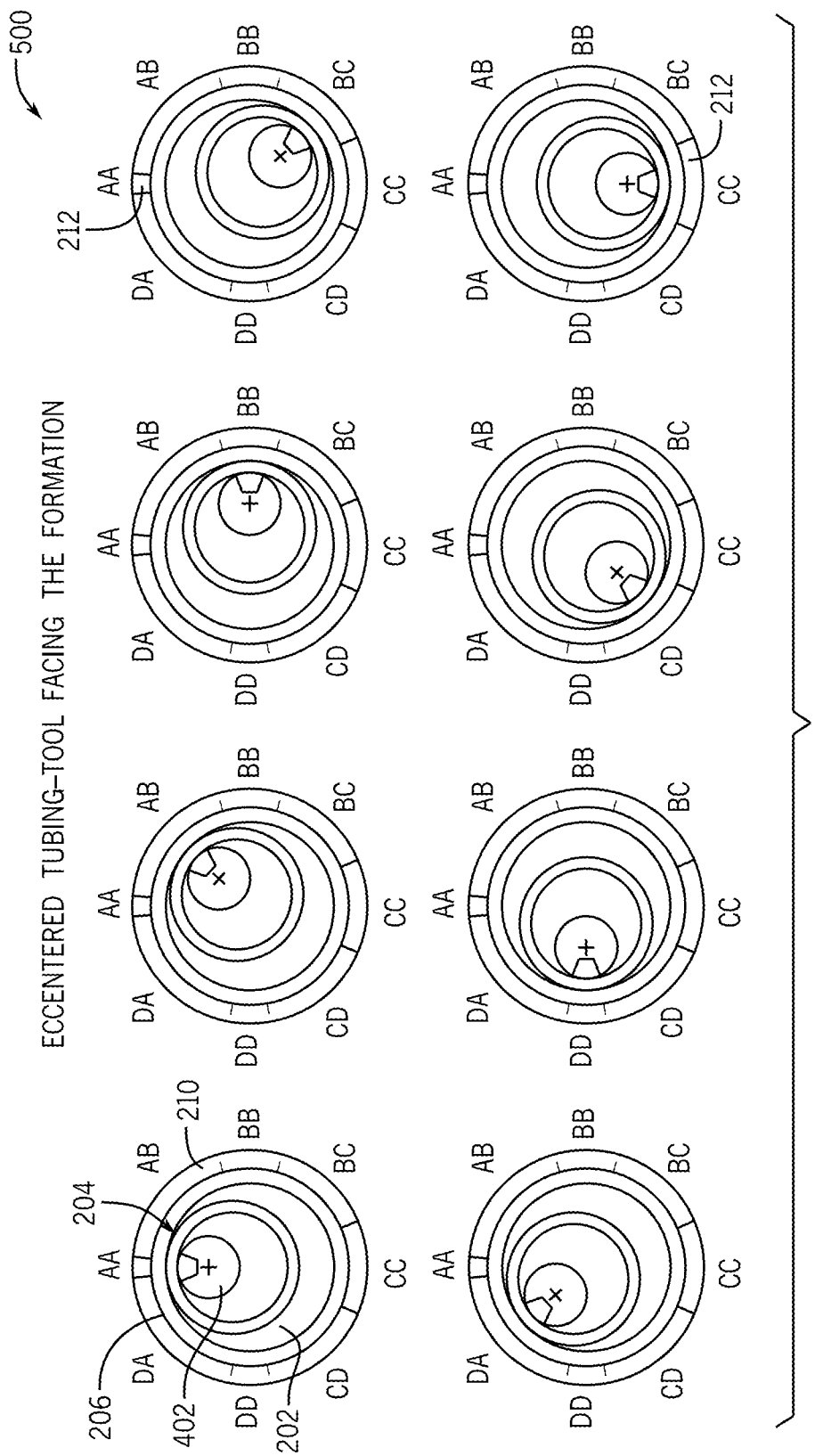
FIG. 5A is a schematic top view of an embodiment of a logging sequence, in accordance with various embodiments.

FIG. 5A illustrates an inspection environment 500 in which the inspection tool 402 is arranged within the tubing 202 within the casing 206. In this example, the tubing 202 is within the annulus 204, with the inspection tool 402 being positioned within the tubing 202, thereby creating multiple different layers (e.g., radial layers) prior to engaging with cement 210. That is, energy emitted from the tool 402 (e.g., gamma rays) travels through at least the tubing 202, the annulus 204, and the casing 206 prior to interacting with the cement 210.

Various embodiments may include one or more inspection tools 402 that provide azimuthal sensitivity, such as by rotating the tool 402 and/or rotating one or more components associated with the tool 402. For example, the tool 402 may include one or more rotatable shields, such as the tool described in U.S. patent application Ser. No. 16/727,109 (now U.S. Pat. No. 11,067,716), which is hereby incorporated by reference in its entirety. In this example, the environment 500 illustrates a sequence of inspection positions where the opening 404 rotates between different positions AA-DA, similar to the sequence described with respect to FIG. 4A. Moreover, in this example, the tool 402 is pushed up against the tubing 202, like in FIG. 4A, but it should be appreciated that various embodiments may not include the tool 402 pushed up against the tubing 202. Furthermore, as noted herein, embodiments further may omit the tubing 202. Additionally, in this example the tubing 202 is shown as being eccentric. That is, the tubing 202 is not centered along an axis of the wellbore, and as a result, certain portions of the tubing 202 are closer to certain portions of the casing 206 than other portions. It should be appreciated that other embodiments may include tubing 202 in a central position, such as the embodiment of FIG. 4A.

Various embodiments of the present disclosure may attempt to minimize or limit count rate differences caused by fluid within the tubing 202 and/or the annulus 204. For example, in the arrangement shown in FIG. 5A, the tool 402 is pushed up against the tubing 202, which is also pushed up against the casing 206. As a result, fluid within the annulus 204 may have a smaller effect on the count rate than in other arrangements where the fluid layer between the tool 402 and one or more of the tubing 202 and/or the casing 206 is larger.

In this example, defects 212 are shown at positions AA and CC with respect to a top view. Following a similar sequence as with FIG. 4A, inspection may commence by rotating one or more of the tubing 202 and/or the tool 402 between different positions AA-AB-BB-BC-CC-CD-DD-DA. Moreover, in this example, the tubing 202 is also moved along with the tubing 202 such that the tubing 202 is pressed up against, or close to, the casing 206, thereby reducing a thickness o fluid between the tubing 202 and the casing 206.

Figure 5B:
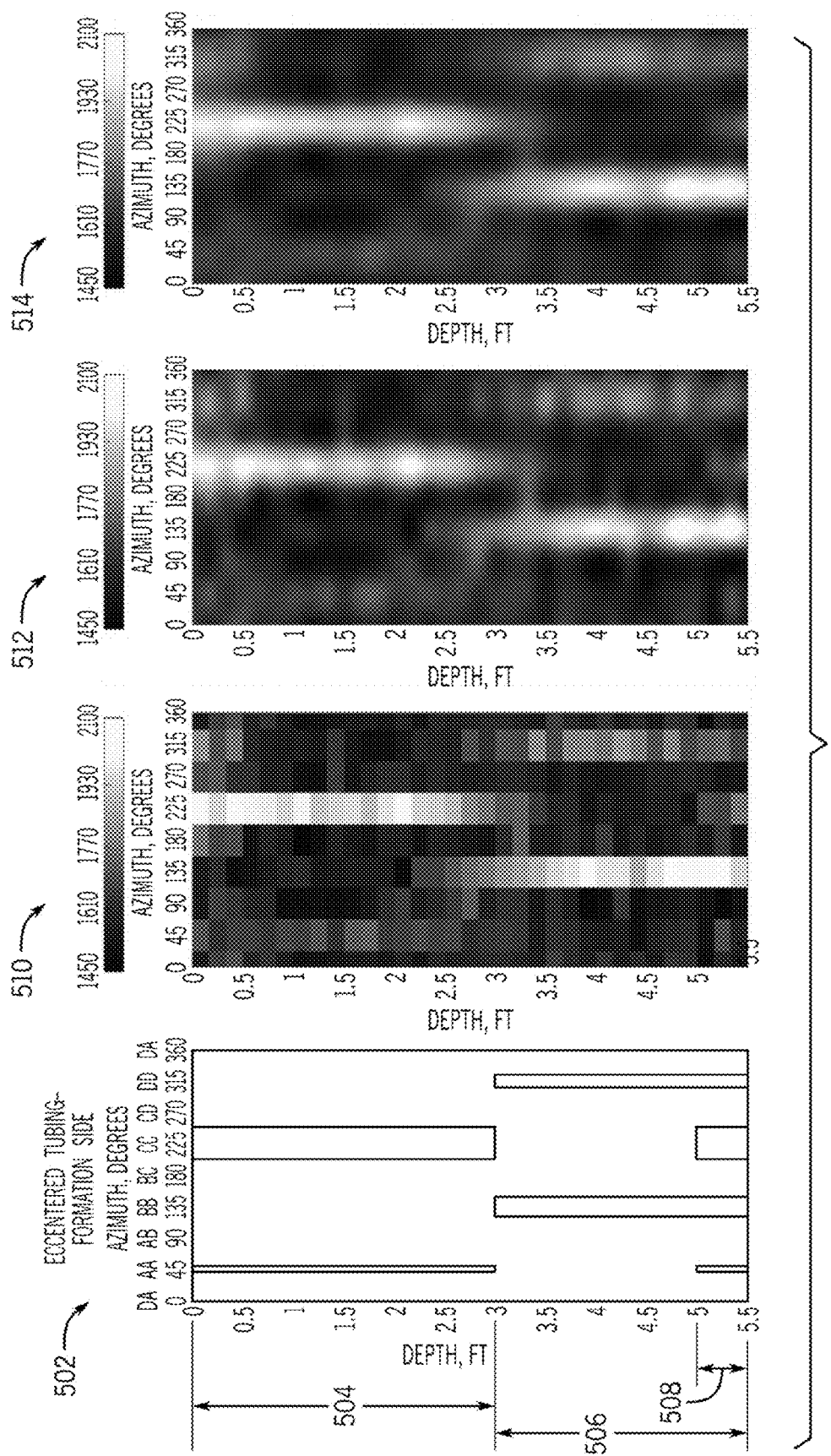
FIG. 5B is an image representation of a logging sequence, in accordance with various embodiments.

As shown in FIG. 5B, a representation 502 illustrates defects at AA and CC along a first length 504, defects at BB and DD for a second length 506, and defects at AA and CC at a different third length 508. Furthermore, the image representations 510-514 further illustrate these defects. For example, the lighter color is representative of the defects, allowing a rapid visual inspection to determine the defects. In at least one embodiment, such images may be provided to one or more software systems for analysis and categorization of defects based, at least in part, on the representations.

In at least one embodiment, different count rates may be used to bin or otherwise identify various defects within the cement 210. For example, a higher count rate may be used in one inspection scenario than other. Embodiments where larger attenuation may be present may use higher count rates in order to verify or otherwise increase a confidence that a defect is present. In at least one embodiment, larger detector crystals may be used to enable receipt of the higher count rates. Additionally, in certain embodiments, defects may be determined by evaluating a ratio or percentage of counts between different portions of the wellbore. For example, if a first region has a count rate that is a percentage higher than a second region, then the first region may be determined as including a defect. In this manner, a total count rate may not be used, but instead, a comparison with adjacent areas in order to reduce inspection time and/or permit the use of smaller detection crystals. It should be appreciated that a variety of processing techniques, filters, and the like may be further be deployed in order to generate image data that provides representations of the wellbore, which may lead to faster or more accurate defect identification.

Figure 6A:
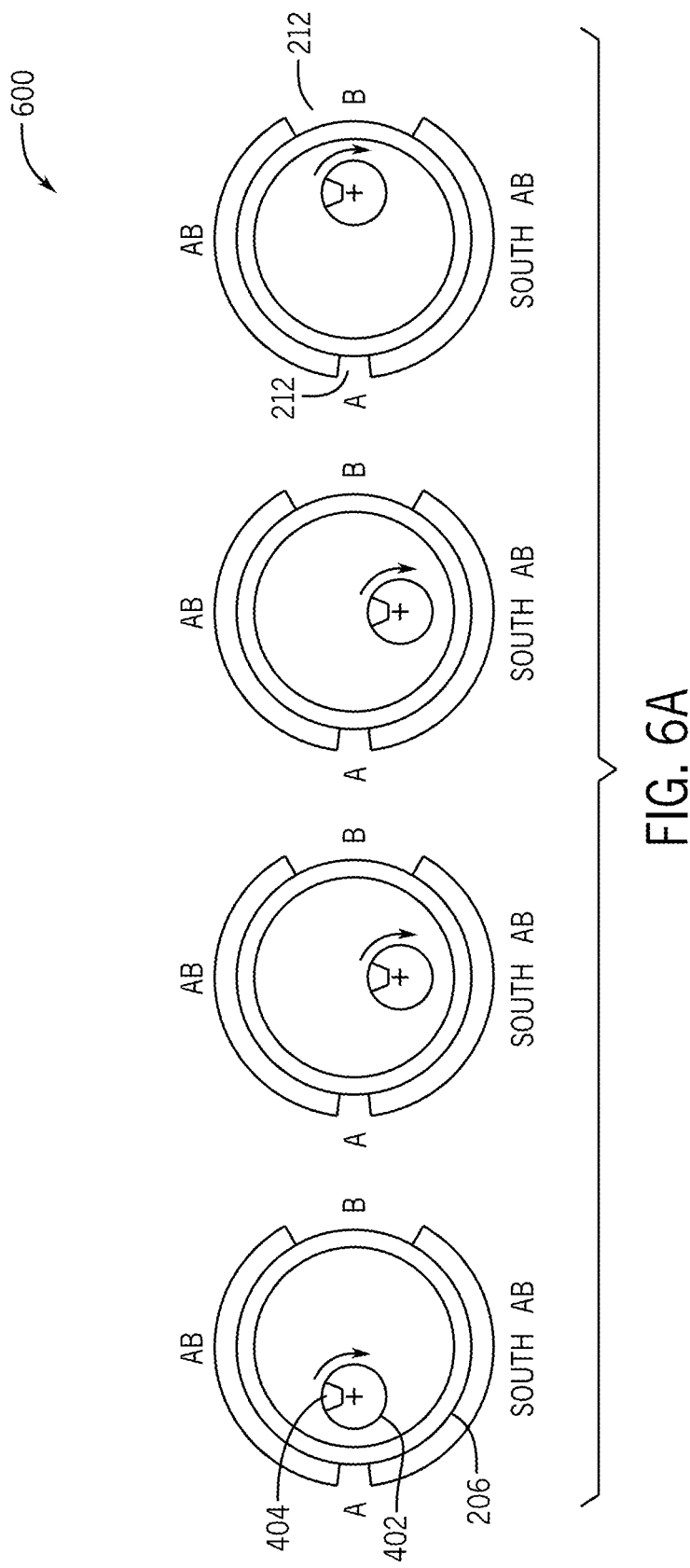
FIG. 6A is a schematic top view of an embodiment of a logging sequence, in accordance with various embodiments.

FIG. 6A illustrates an inspection environment 600 in which a fluid quantity between the tool 402 and the casing 206 is variable at different positions. That is, the opening 404 may have a different radial distance to the casing 206, in which the annulus may be filled with fluid or other materials, which may affect measurements obtained using one or more systems and methods of the present disclosure. As shown in FIG. 6A, defects 212 are illustrated as positions A and B, with the defect at A being smaller than the defect at B. In this instance, smaller refers to the circumferential extent of the defects 212 at A and B.

Figure 6B:
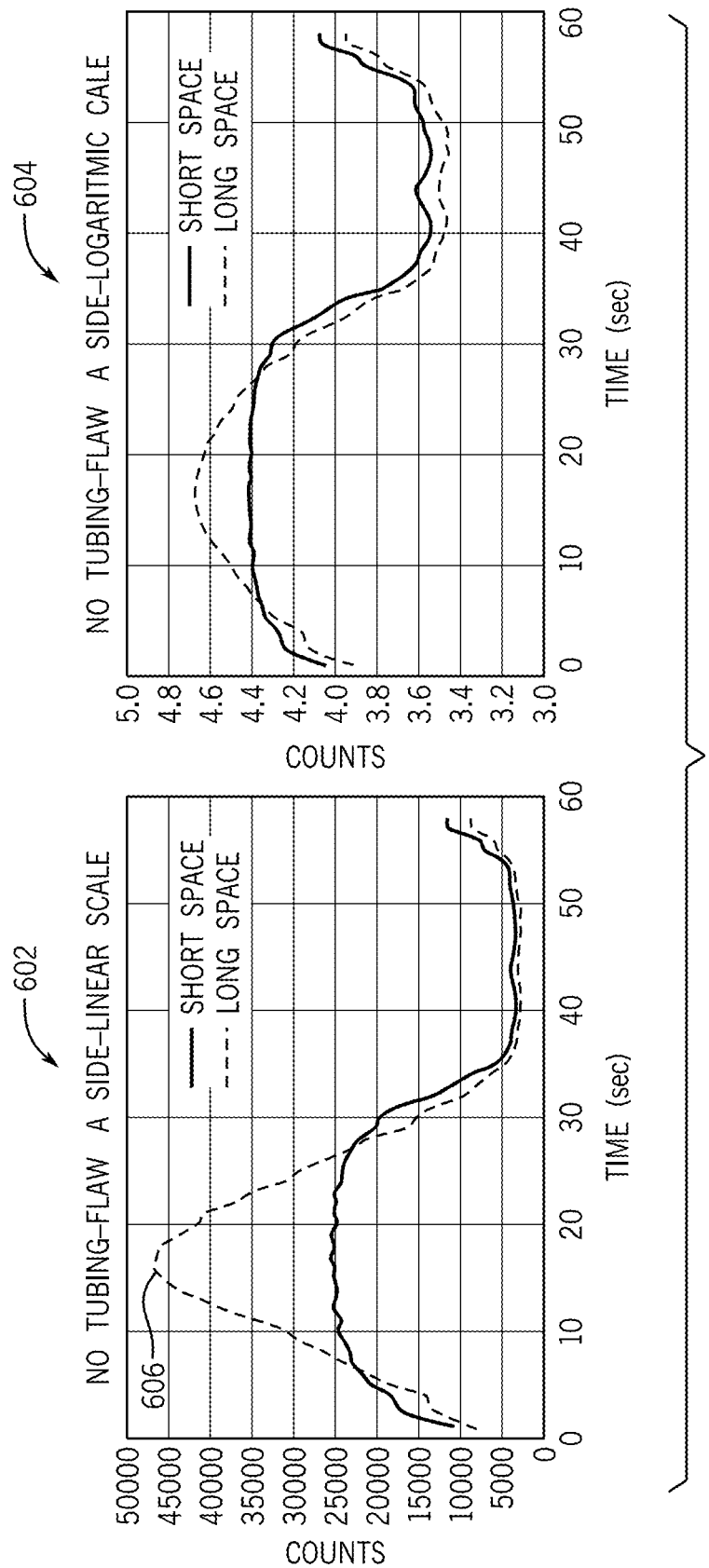
FIG. 6B is an graphical representation of a logging sequence, in accordance with various embodiments.

FIG. 6B illustrates graphical representations 602, 604 of count rates as a function of fluid in front of the tool face. As shown, the count rates recorded in a gamma tool increase significantly with increasing fluid in front of the tool face. FIG. 6B illustrates the count rate profile with the tool rotation for the A position in FIG. 6A, with both liner and logarithmic profiles in representations 602, 604, respectively.

As shown in the linear representation 602, count rate is shown significantly higher at a peak 606 corresponding to an increased amount of fluid between the tool 402 and the defect at A. Various embodiments of the present disclosure may incorporate one or more data processing techniques to account for and adjust for such a peak. As an example, embodiments may include one or more fluid displacers to reduce an amount of fluid between the tool 402 and the defect (e.g., a region to be interrogated). Furthermore, embodiments may incorporate techniques, such as those seen in FIGS. 4A and 5A, to reduce the quantity of fluid between the tool 402 and the casing 206.

Figure 7A:
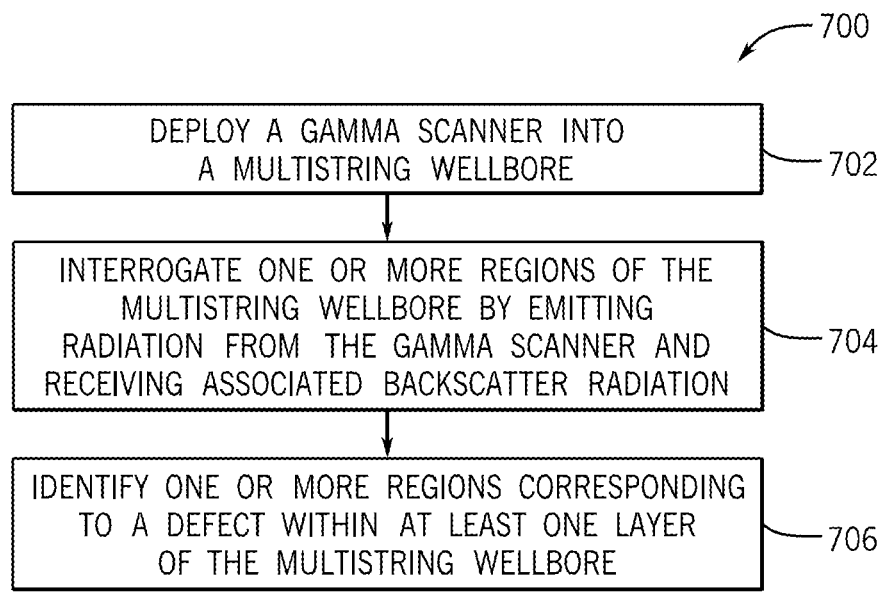
FIG. 7A is a flow chart of an embodiment of a method for identifying one or more regions of interest in a multistring wellbore, in accordance with various embodiments.

FIG. 7A is a flow chart of an embodiment of a method 700 for identifying defects within one or more layers of a multistring wellbore. It should be appreciated that for this method, and all methods described herein, that there may be more or fewer steps. Additionally, the steps may be performed in a different order, or in parallel, unless otherwise specifically stated. In this example, a gamma scanner is deployed into a multistring wellbore 702. For example, a gamma scanner may be tripped into a wellbore, such as using a wireline, and positioned within an annulus and/or or tubing of the multistring wellbore. The gamma scanner may be used to interrogate the multistring wellbore 704. Interrogation may include emitting radiation from one or more sources, which may include, but are not limited to, gamma ray sources, x-ray sources, and the like. The emitted radiation may interact with one or more components of the multistring wellbore and/or with a formation, and produce backscatter radiation, which may be received by one or more detectors. The received backscatter radiation may be tracked or otherwise recorded as counts, where a count includes both a number of instances of radiation received. It should be appreciated that certain detectors may measure both an energy of the received particle, as well as a number of particles received, but various embodiments may also be used to determine a total number of counts without recording the energy of the particle received. Using the received counts, one or more regions corresponding to defects may be identified 706. The identified regions may correspond to areas having larger counts, which may be indicative of fewer interactions prior to backscatter, or may correspond to areas having a percentage or threshold greater number of counts than adjacent regions, among other options. In this manner, systems and methods may be used to interrogate different wellbore configurations to identify defects within different parts of a multistring arrangement, such as one or more cement layers.

Figure 7B:
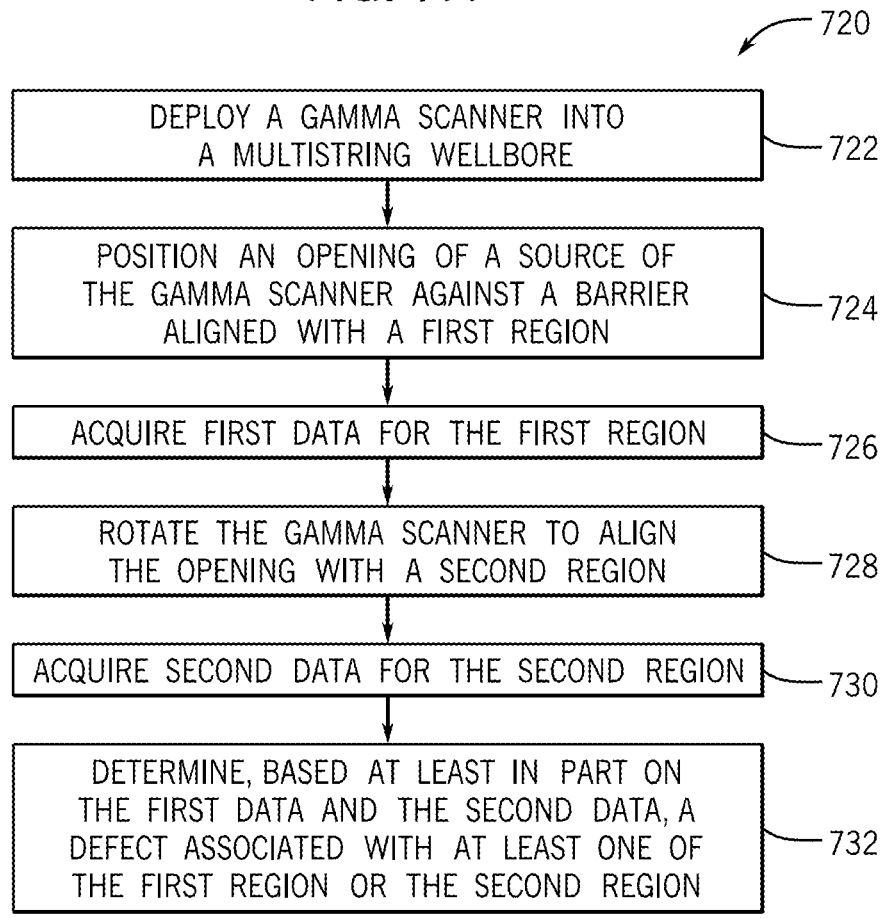
FIG. 7B is a flow chart of an embodiment of a method for identifying a defect within a multistring wellbore, in accordance with various embodiments.

FIG. 7B illustrates a flow chart for an embodiment of a method 720 for identifying defects of a multistring arrangement. In this example, a gamma scanner is deployed into a multistring wellbore 722 and an opening associated with a source of the gamma scanner is positioned against a barrier 724. The barrier may be aligned with a first region of interest. In at least one embodiment, the barrier is part of tubing positioned within the wellbore. In at least one embodiment, the barrier is part of casing positioned within the wellbore. Various embodiments may further drive the barrier against a second barrier to reduce a fluid thickness between the opening and a cement layer.

First data may be acquired for the first region 726, which may correspond to nuclear data that is obtained from emitting radioactive particles into the formation and/or multistring wellbore and then detecting returning backscatter radiation. In various embodiments, it may be desirable to obtain an azimuthal view of the multistring wellbore, and as such, the gamma scanner may be rotated to align the opening with a second region 728. Rotation of the gamma scanner may include rotation of the tool itself and/or rotation of a component associated with the tool, such as a tubing containing the tool and/or a collimator that moves a position of the opening. In at least one embodiment, second data is acquired 730 and the first and second data may then be used to identify one or more defects of the first and second regions 732.

Figure 8A:
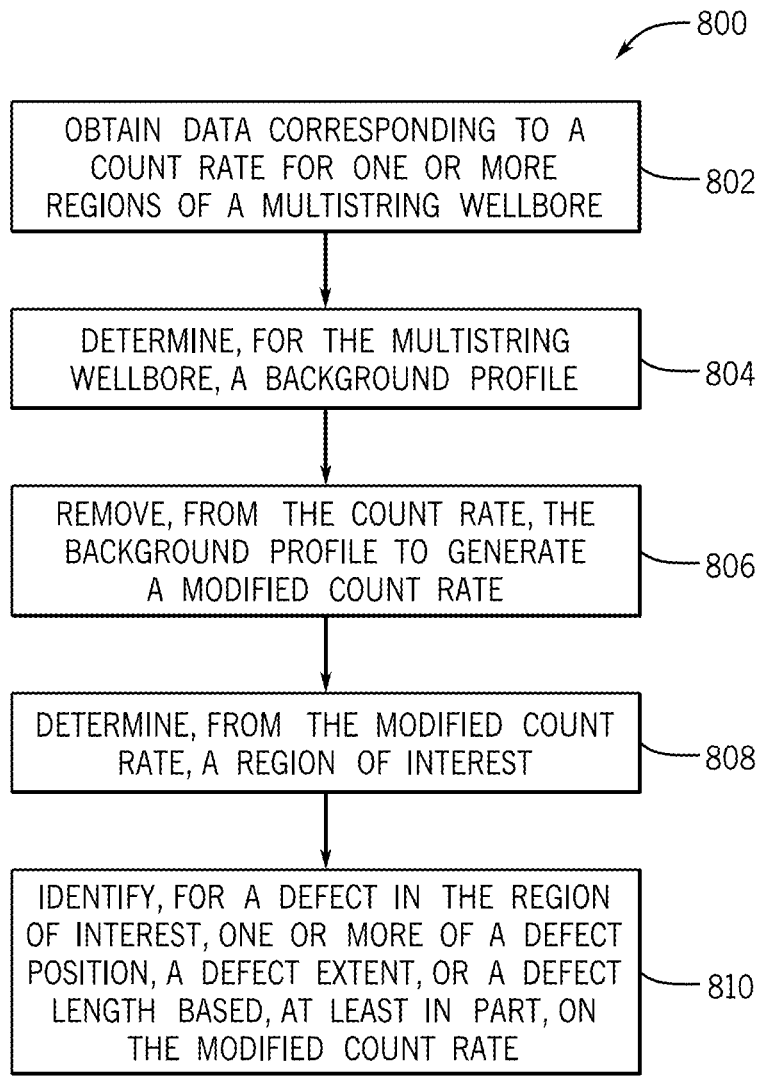
FIG. 8A is a flow chart of an embodiment of a method for identifying a defect within a multistring wellbore, in accordance with various embodiments.

FIG. 8A is a flow chart of an embodiment of a method 800 for identifying one or more properties of a defect within a region of interest. In this example, data corresponding to a count rate for one or more regions of a multi string wellbore is obtained 802. For example, the data may be backscatter radiation obtained from one or more gamma scanners. In various embodiments, a background profile may be determined for the multistring wellbore 804, and that background profile may be removed from the count rate 806, thereby generating a modified count rate. The modified count rate may then be used to determine a region of interest 808, which may include one or more defects. For the one or more defects, different properties of the defect may be determined 810, such as position, extent, length, and the like.

Figure 8B:
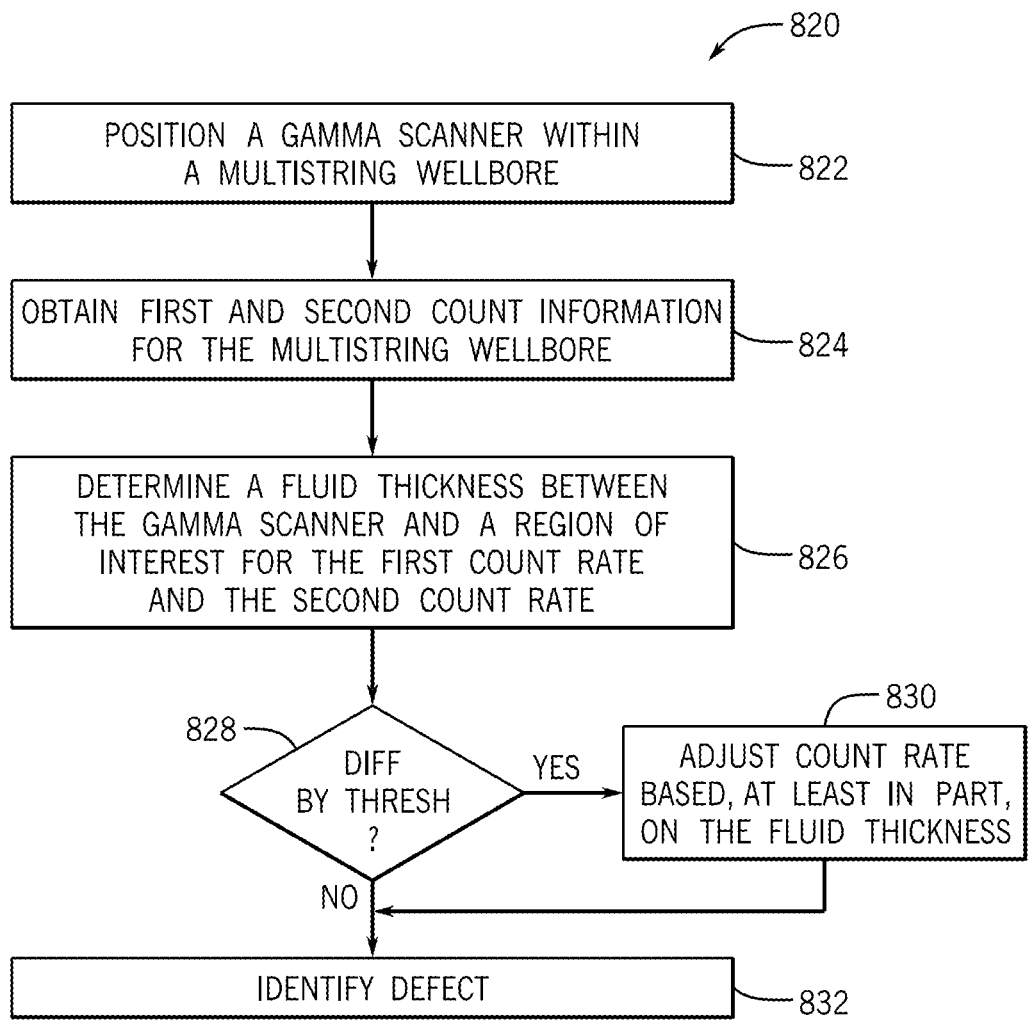
FIG. 8B is a flow chart of an embodiment of a method for identifying a defect within a multistring wellbore, in accordance with various embodiments.

FIG. 8B is a flow chart of an embodiment of a method 820 for identifying a defect associated with a multistring wellbore. In this example, a gamma scanner is positioned within a multistring wellbore 822 and first and second count information is acquired for the multistring wellbore 824. In at least one embodiment, a fluid thickness between the gamma scanner and a region of interest is determined for both the first count rate and the second count rate 826. It is then determined whether a difference between the fluid thicknesses exceeds a threshold 828. If so, then the count rate may be adjusted according to the fluid thickness 830. If not, the count rate may be used to identify a defect 832.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

What is claimed is:

1. A method for identifying a defect within a cement layer of a multistring wellbore, comprising:
    deploying a gamma scanner into the multistring wellbore, the gamma scanner including at least one source and at least one detector, the at least one source emitting radiation into the multistring wellbore and the at least one detector receiving backscatter radiation, wherein the emitted radiation is directable about a wellbore axis to obtain an azimuthal scan of the multistring wellbore;
    obtaining, from the gamma scanner, a count rate associated with at least one region of interest of the multistring wellbore;
    identifying, based at least in part on data acquired from the gamma scanner, a background profile for the multistring wellbore, wherein the background profile includes at least sinusoidal background data;
    removing the background profile from the count rate; and
    identifying, within the at least one region of interest, a defect within the cement layer.

2. The method of claim 1, wherein the background profile is removed using one or more signal processing techniques.

3. The method of claim 1, further comprising:
    aligning an opening corresponding to the source with a first region prior to obtaining the count rate;
    rotating the opening after obtaining the count rate; and
    obtaining a second count rate after rotating the opening.

4. The method of claim 3, wherein the count rate corresponds to a first region of the at least one region of interest and the second count rate corresponding to a second region, different from the first region, of the at least one region.

5. The method of claim 3, further comprising:
    incrementally rotating the opening about the wellbore axis to obtain a respective count rate for each incremental rotation of a 360 degree rotation, wherein the incremental rotation is one of stepwise rotation or continuous rotation.

6. The method of claim 3, wherein the opening is pressed against a barrier within the multistring wellbore.

7. The method of claim 1, further comprising:
    moving the gamma scanner to a deeper axial position after obtaining the count rate;
    obtaining a second count rate at the deeper axial position; and
    determining an axial length of the defect based, at least in part, on the second count rate.

8. The method of claim 1, further comprising:
    obtaining count rates for a plurality of regions representing a circumference of the multistring wellbore; and
    generating, from the count rates, a two-dimensional representation of the circumference.

9. The method of claim 1, wherein the gamma scanner is positioned within a tubing that is eccentric within the multistring wellbore.

10. A method for identifying a defect within a multistring wellbore, comprising:
    aligning a scanning tool with a first region of interest of the multistring wellbore;
    obtaining first data corresponding to a first count rate at the first region of interest;
    aligning the scanning tool with a second region of interest of the multistring wellbore;
    obtaining second data corresponding to a second count rate for the second region of interest;
    identifying based at least in part on the first count rate and the second count rate, a defect within at least one of the first region of interest or the second region of interest, the defect being associated with a cement layer of the multistring wellbore that is behind at least one other intermediate layer positioned between the scanning tool and the cement layer.

11. The method of claim 10, further comprising:
    aligning the scanning tool with a third region of interest of the multistring wellbore;
    obtaining third data corresponding to a third count rate for the third region of interest; and
    repeating realigning of the scanning tool and acquiring data until a full 360 degree profile of the multistring wellbore is obtained.

12. The method of claim 10, wherein the aligning includes rotating the scanning tool.

13. The method of claim 10, wherein the aligning includes rotating a tubular that includes the scanning tool.

14. The method of claim 10, wherein the aligning includes rotating an opening of a collimator associated with the scanning tool.

15. The method of claim 10, further comprising:
    determining a background count rate; and
    subtracting the background count rate from the first count rate and the second count rate.

16. The method of claim 10, wherein the aligning comprises pressing the scanning tool against a barrier between the scanning tool and the cement layer.

17. A method for identifying a defect within a cement layer of a multistring wellbore, comprising:
    deploying a gamma scanner into the multistring wellbore, the gamma scanner including at least one source and at least one detector, the at least one source emitting radiation into the multistring wellbore and the at least one detector receiving backscatter radiation, wherein the emitted radiation is directable about a wellbore axis to obtain an azimuthal scan of the multistring wellbore;
    obtaining, from the gamma scanner, a count rate associated with at least one region of interest of the multistring wellbore;
    identifying, based at least in part on data acquired from the gamma scanner, a background profile for the multistring wellbore;
    removing the background profile from the count rate;
    identifying, within the at least one region of interest, a defect within the cement layer;
    moving the gamma scanner to a deeper axial position after obtaining the count rate;
    obtaining a second count rate at the deeper axial position; and
    determining an axial length of the defect based, at least in part, on the second count rate.

18. The method of claim 17, further comprising:
    aligning an opening corresponding to the source with a first region prior to obtaining the count rate;
    rotating the opening after obtaining the count rate; and
    obtaining a third count rate after rotating the opening.

19. The method of claim 18, further comprising:
    incrementally rotating the opening about the wellbore axis to obtain a respective count rate for each incremental rotation of a 360 degree rotation, wherein the incremental rotation is one of stepwise rotation or continuous rotation.

20. The method of claim 18, wherein the opening is pressed against a barrier within the multistring wellbore.

\* \* \* \* \*